UNIVERSAL SWEEP AND HIGH-VOLTAGE TRANSFORMER

Filed May 27, 1949

2 Sheets-Sheet 1

Inventor:
Charles E. Torsch,
by Merton D. Moore
His Attorney.

UNIVERSAL SWEEP AND HIGH-VOLTAGE TRANSFORMER

Filed May 27, 1949

2 Sheets-Sheet 2

Inventor:
Charles E. Torsch,
by Merton D. Morse
His Attorney.

Patented May 19, 1953

2,639,319

UNITED STATES PATENT OFFICE 2,639,319

UNIVERSAL SWEEP AND HIGH-VOLTAGE TRANSFORMER

Charles E. Torsch, North Syracuse, N. Y., assignor to General Electric Company, a corporation of New York Application May 27, 1949, Serial No. 95,852

8 Claims. (Cl. 175—356)

Figure 1:
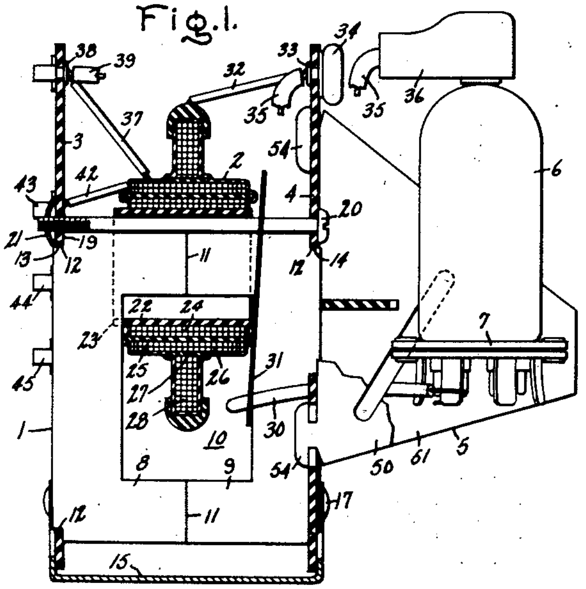

My invention relates to transformers, and, more particularly, to a universal type transformer which is suitable for use in a television receiver, especially in the horizontal scanning and high voltage sections of the receiver. It is a primary object of my invention to provide a universal type sweep and high voltage transformer of high efficiency and adaptability to various circuit arrangements.

In present television receivers a substantial portion of the cost, weight, heat, and power consumption is required to produce the necessary electromagnetic deflection of and high voltage for the cathode ray tube of the receiver. The heart of the electromagnetic deflection and high voltage section of the receiver is the line frequency sweep and high voltage transformer. Hence, there is a pressing need for a transformer of high efficiency and reduced weight and power consumption in competitively marketed receivers. Also, with the advent of improved cathode ray tubes which provide increased brilliance and contrast, and which require higher anode voltage and increased sweep energy, it becomes necessary to provide a more efficient universal type transformer which may be substituted in existing receivers to meet the more stringent requirements of the new type cathode ray tubes without materially increasing the loading on the power supply of the receivers.

In addition, various types of deflection yokes, power feedback circuits, diode and triode damping tubes, and picture width controls, all of which units are intimately connected with the sweep and high voltage transformer, have been included in present day receivers. Therefore, to provide a transformer that is universal in application requires that the transformer be capable of considerable flexibility so as to meet the varying requirements of present day and future television circuit arrangements.

It is another object of my invention to provide a new and improved universal type sweep and high voltage transformer which is adapted to be used with many and varied types of circuit arrangements such as are found, for example in present day television receivers.

It is a further object of my invention to provide a new and improved universal type sweep and high voltage transformer in which extremely close coupling is provided between the individual coils of the transformer.

It is a still further object of my invention to provide a universal type sweep and high voltage transformer in which novel means are provided for mounting the high voltage rectifier associated with the transformer.

In carrying out my invention in one form thereof, I provide a transformer core of ferrite magnetic material having relatively high permeability and having a high energy factor. Solenoidal type primary and secondary windings of equal traverse are provided about one leg of the transformer core, and a tertiary winding of pancake construction is positioned centrally of the length of the primary and secondary windings and centrally of the window opening of the transformer core, the primary, secondary and tertiary windings being concentric so that extremely close coupling is provided between primary and secondary. By such construction leakage reactance between primary and secondary windings is minimized and extremely efficient use is made of energy supplied to the primary. Universality of application of the transformer is afforded by providing the secondary winding with a plurality of taps spaced apart by substantial increments of inductance so as to allow for significant changes in scanning yoke inductances and tube arrangements which may be connected thereto. The core of ferrite magnetic material is suspended in a frame which provides mechanical support for and compression upon the U-shaped halves of the core assembly and upon which are mounted terminals for the coils of the transformer and supporting brackets for the high voltage rectifier tube.

Figure 2:
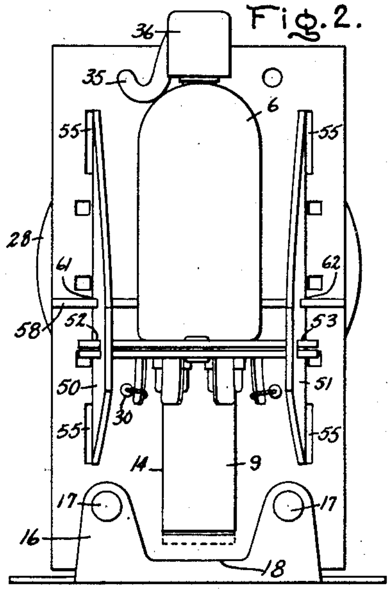
Figure 3:
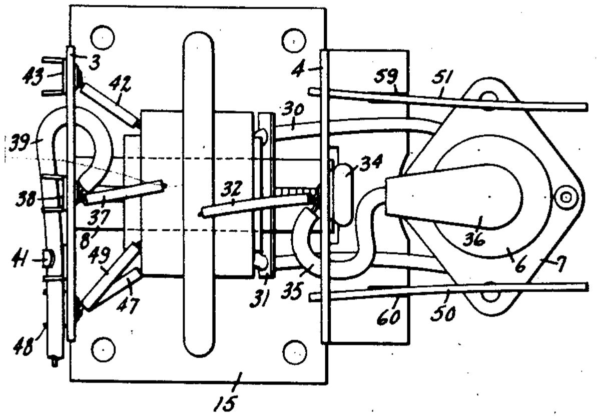
Figure 4:
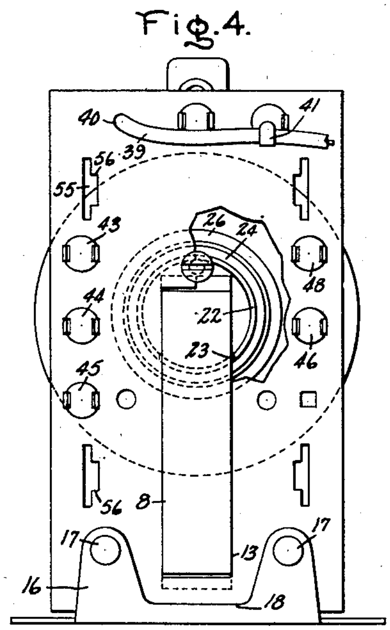
Figures 5, 6, 7, 8:
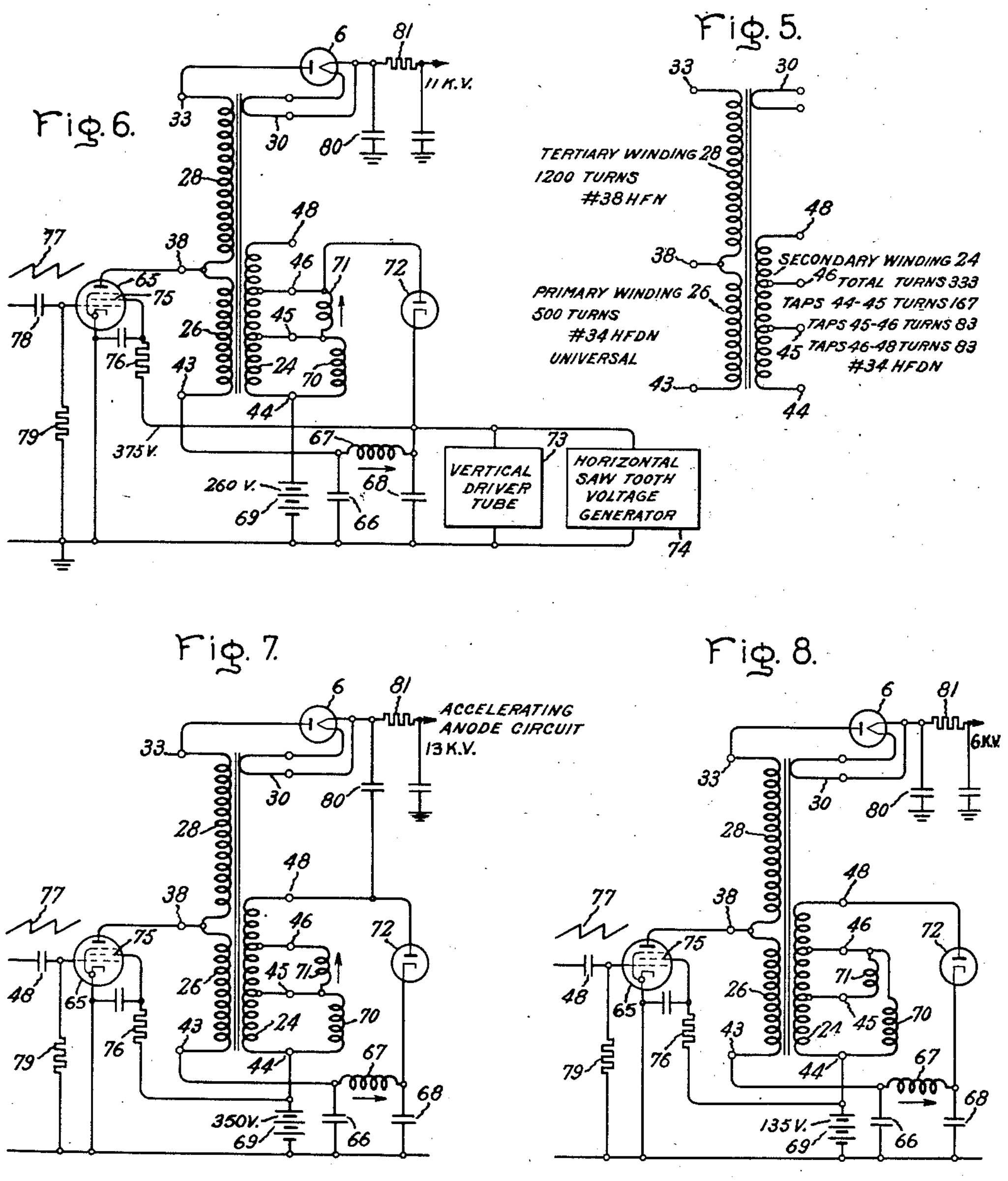

The features of my invention which I believe to be novel are set forth with particularity in the appended claims. My invention itself, however, both as to its organization and method of operation, together with further objects and advantages thereof, my best be understood by reference to the following description taken in connection with the accompanying drawing, in which Fig. 1 is a side elevation view of the universal sweep and high voltage transformer and rectifier therefor; Fig. 2 is an end elevation view of the arrangement shown in Fig. 1 taken from the rectifier side thereof; Fig. 3 is a plan view of the transformer of Fig. 1; Fig. 4 is an end elevation view of the transformer taken from the opposite side; Fig. 5 is a schematic diagram of the transformer, and Figs. 6, 7 and 8 are schematic diagrams of various circuit arrangements in which the universal transformer may be utilized.

Referring now to Fig. 1 of the drawing, the universal sweep and high voltage transformer is illustrated therein as comprising a transformer core assembly indicated generally at 1, having a coil assembly, indicated generally at 2 mounted thereon. The transformer core and coil assembly is suspended between a pair of upstanding side panels 3, 4 in a manner to be described more fully hereinafter. A pair of mounting brackets indicated generally at 5, is provided from the side panel 4 so as to support the high voltage rectifier tube 6 and associated wafer type tube socket 7.

As used in this specification, the term "ferrite magnetic material" is understood to include ferrites and ferromagnetic oxides, including mixtures thereof. Ferrites are essentially compounds of one or more metal oxides and ferricoxide. Mixed oxides of the magnetic type are dscribed, for example, in United States Patents Nos. 1,976,230 and 1,997,193 which issued to Yogoro Kato et al. Also, such compounds are described in an article entitled "Relations between chemical constitution and magnetic properties of iron compounds" by Siegfried Hilfert which was published in Verhandlungen der Deutschen Physikalischen Gesellschaft, vol. 11, 1909, pages 293 to 299; and in an article entitled "Magnetic and electrical properties of the binary systems MO. $Fe_2O_3$" by J. C. Luvek which was published in the periodical "Physica," vol. III, No. 6, for June 1936, at pages 463 to 483. Ferrite magnetic core material exhibits high specific resistivity as compared to conventional laminated or powdered iron cores and hence impedes current flow at high frequencies, such as are involved in the retrace period of the television scanning cycle. Also such ferrite magnetic material possesses a relatively high permeability and energy factor.

The transformer core assembly 1 comprises a pair of U-shaped core members 8, 9 which are positioned in opposed relation so as to define a generally rectangular window opening 10 therebetween. The core members 8, 9 are preferably constructed of ferrite magnetic material as discussed above. Members 8, 9 may be molded to shape under relatively low pressure and are placed in kilns and fired for a considerable length of time at high temperatures. The provision of separate U-shaped core members allows for convenient resting of the individual core members in interlocking rows during kiln firing.

The window 10 defined by the opposed core members 8, 9 is chosen with respect to the width of the coil assembly 2, so as to provide a minimum of winding clearance therefor and to produce high shunt inductance relative to load circuits connected thereto, as will be described more fully hereinafter. While the ferromagnetic core members 8, 9 have high insulating qualities so as to permit utilization of substantially the entire width of the window opening 10 for the coil assembly 2, additional provision has been made for minimizing the loss of core efficiency in the presence of high humidity which would tend to penetrate the surface pores of the core, by coating the core members 8, 9 with a protective lacquer which is applied to all surfaces of the core member except the abutting surfaces 11 thereof. The surfaces 11 may be separated with a small air gap to secure maximum alternating current inductance with a direct current core flux component.

The core members 8, 9 are provided with notches 12 at the corners thereof, the notches 12 defining projections of reduced cross-section which are adapted to project through aligned apertures 13, 14 provided respectively in the side panels 3, 4. The side panels 3, 4 are supported from a base member 15 which member is provided with upturned ear portions 16 to which the side panels 3, 4 may be secured by any convenient means such as by riveting or the like as is illustrated at 17. Member 15 may be secured to the chassis in any convenient position by any suitable means such as speed screws or the like. The ear portions 16 are provided with central cut-away portions 18, so as to provide clearance for the core members 8, 9. The spacing between side panels 3, 4, is such that the shoulder portions 19, defined in the core members 8, 9 by the notches 12, will engage the edges of the side panels 3, 4 adjacent the apertures 13, 14 therein, so as to provide compression of the opposed U-shaped core members 8, 9 when the same are positioned between the side panels. The upper portion of the opposed core members 8, 9 is held in compression by means of a bolt 20 which extends through the side panels 3, 4 at a point just above the core members, the bolt 20 being provided with a speed nut 21 so as to provide the proper clamping pressure on the upper portion of the core assembly.

It will be apparent from the above that the transformer core and coil assembly may be conveniently inserted into or removed from between the side panels 3, 4 by removing the bolt 20 and spreading the side panels 3, 4 apart slightly so as to free the projecting portions of the core from the aligned apertures 13, 14 in the side panels. The core and coil assembly may then be lifted out of their supporting structure.

Referring now more particularly to the coil assembly 2, there is provided about the upper leg of the core assembly a cylindrical coil form 22. The coil form 22 is somewhat longer than the width of the window opening 10, there being provided a notch 23 in one end of the coil form 22 so as to provide a key-way which fits over the core and prevents rotation of the coil form about the core. It will be understood that the mounting bolt 20 extends through the coil form in the recess formed between the coil form and the top of the core assembly, as is most readily apparent by inspection of Fig. 4. Solenoidal type secondary coil 24 is wound about the coil form 22 and extends for substantially the full width of the window opening 10. A layer of insulating tape 25 is provided about the outside of the secondary coil 24, and a solenoidal type primary winding 26 is wound about the insulating tape 25. Primary winding 26 also extends for substantially the full width of the window opening.

The solenoidal type primary and secondary coils 26, 24 are concentrically wound so as to provide extremely close coupling therebetween. Insulating tape 27 is provided about the central portion of primary coil 26, and a tertiary winding 28, of pancake construction is wound about the central portion of primary 26. Tertiary winding 28 has a relatively narrow winding traverse and is of substantially greater depth than width. The tertiary winding 28 is positioned centrally of the window opening 10 so as to provide adequate insulations for the high voltage which will be produced thereacross.

To provide heating current for the high voltage rectifier tube 6, which may be a type 1B3-GT rectifier, I provide a single turn coil comprising lead 30 which is looped about core member 9. To position the lead 30 with respect to the core member 9, a relatively thin sheet of insulating material 31 is placed between the edge of the coil assembly and the core member 9, the sheet 31 having holes punched therein so as to receive the insulated lead 30. Lead 30 makes a single turn around the core member 9, the ends of lead 30 being connected to the appropriate terminals on the high voltage rectifier socket 7. It will be appreciated that the spacing of the apertures in sheet 31 and the positioning of lead 30 thereon is made appropriate so as to produce the proper induced voltage in lead 30 so as to heat the cathode of the rectifier tube 6 by means of energy derived from the transformer.

The connections for the several coils and the physical location of the coil leads and terminals therefor are shown in Figs. 1, 3 and 4 wherein similar elements are indicated by the same reference characters. The finish of tertiary winding 28 is brought out through a lead 32 to a terminal member 33 which is positioned on side panel 4. Terminal 33 is also used to secure a corona preventing button 34 on the other side of side panel 4. A lead wire 35 is also connected to terminal 33, lead 35 being used to connect the high voltage produced across the tertiary winding 28 and primary winding 26 to the anode of the rectifier tube 6 through the insulated anode cap 36. The lead wires 32 and 35 are connected to the corona preventing button 34 by means of soldering or the like.

The finish of primary winding 26, which is also the start of tertiary winding 28, is brought out from a point midway between the edge of coil 26 and tertiary winding 28 through a lead 37 to a terminal member 38 which is secured to side panel 3. By providing the finish lead of coil 26 at a point other than the end thereof, substantially less corona is experienced than if the lead wire 37 were taken directly from the outside corner of coil 26. There is also connected to terminal 38 a lead wire 39, which extends through an aperture 40 in side panel 3, and which is used to connect one end of the primary winding 26 to the anode of the horizontal scanning driver tube. In the event that anode lead 39 is of too great a length for some applications, the lead 39 may be conveniently shortened by clamping the same to the terminal board by means of an extra terminal member 41, as is best illustrated in Figs. 3 and 4.

The start of primary winding 26 is connected through a lead wire 42 to a terminal 43 on side panel 3. The start of secondary winding 24 is brought out to a terminal 48 by means of a lead wire 49. A first tap on secondary winding 24 is brought out to terminal 46, through a lead wire 47. The lead wires to terminals 44 and 45 are directly under lead wire 42 so that they are not visible in the drawing. A second tap on secondary winding 24 is brought out to a terminal 45, illustrated in Fig. 4. The finish of secondary winding 24 is brought out to a terminal 44.

It will be noted from the above that the side panels 3, 4 serve as terminal boards for the terminals associated with the various coil connections, in addition to providing a means for suspending the entire core and coil transformer assembly. The coil connections are brought out at spaced points along the periphery of the coil assembly so that corona discharge between coil connections is avoided. The use of a round coil form 22 is particularly suitable as it allows a precision winding of the "universal" type so as to provide simplicity of insulation. With the present construction very satisfactory results are obtained and a coupling between primary and secondary windings of approximately 99%, is obtained as a result of my improved concentric type of coil and core construction.

It will also be noted that the use of an above chassis mounting of the transformer core and coil assembly such as is obtained by my improved transformer construction enables the axis of the magnetic field produced by the transformer to be adjusted to any desired position. Thus, the electromagnetic field set up by flow of current through the coils of the transformer may be positioned so as to minimize stray field interaction with the cathode ray tube of the television receiver. Such a condition may be obtained for example, by orienting the core of the transformer parallel to the longitudinal axis of the cathode ray tube.

In order to mount the high voltage rectifier 6, which is utilized to rectify the high voltage produced across tertiary winding 28 and primary winding 26, without the use of metal parts such as screws and bolts or the like, which would concentrate the electrostatic field and produce corona thereby, I provide a pair of mounting brackets 50, 51 of suitable insulating material which are supported from the side panel 4 in a manner to be described more fully hereinafter. The brackets 50, 51 are provided with horizontally disposed slots 52, 53 through which may be inserted the edge portions of the wafer socket 7. The socket 7 may be inserted into or removed from the supporting brackets 50, 51 by spreading the brackets sufficiently to allow removal of the edge portions of the socket from the slots 52, 53.

Referring now to the manner in which the brackets 50, 51 are supported on side panel 4 without the use of mounting screws or the like, each bracket is provided with a pair of projecting lug portions 54 which are adapted to be inserted through apertures 55 in side panel 4. Apertures 55 are provided with reduced notch portions 56, as is best illustrated in Fig. 4, the notches 56 being adapted to receive undercut portions 57 of the projections 54. The projections 54 are inserted into the apertures 55 and moved sideways so as to lock the undercut portions 57 within the notches 56. To produce a wedging action which forces the undercut portions 57 into the notches 56, there is provided a transverse member 58 of suitable insulating material, in which are provided slots 59, 60, which extend inwardly from one edge of member 58 for approximately one-half the width thereof. The mounting brackets 50, 51 are also provided with slots 61, 62, which extend inwardly from one edge thereof, so that the mounting brackets 50, 51 and transverse member 58 may be interfitted to form a generally H-shaped structure. The notches 59, 60 in the transverse member 58 are spaced somewhat closer together than the distance between the notch portions 56 of apertures 55 so that the brackets 50, 51 have to be spread apart to enter the apertures 55. The projections 54 are thus urged towards each other so as to force the cutaway portions thereof into the locking notches 56. By such construction the rectifier and associated tube socket therefore may be conveniently mounted on the side of the transformer assembly without the use of any metallic parts which would tend to concentrate the high voltage field existing around the transformer.

From an inspection of Figs. 2 and 4 it is evident that side panels 3, 4 are of identical construction, the terminals 43, 44, 45, 46, and 48 of side panel 3 being omitted for side panel 4, and the apertures 55, which are used to mount the rectifier assembly, being left blank for side panel 3. The side panels 3, 4 may thus be identically punched with consequent economy of time and cost.

In Fig. 5 there is illustrated in schematic form a universal transformer constructed in accordance with the principles of my invention. By way of specific example, and not in any sense as a limitation thereon, the winding data given in Fig. 5 has been found satisfactory when employing a 7/8 inch diameter coil form with 7/8 inch wide cam wound coils as primary and secondary windings 26, 24 and a 1/8 inch wide cam wound tertiary winding 28.

The transformation ratio between primary winding 26 and the full secondary winding 24 (between taps 44 and 48) is made equal to 1½ to 1, which is the optimum ratio for those power feedback circuits which are loaded only by the driver tube anode circuit, as will be discussed more fully hereinafter. The ratio between primary winding 26 and the portion of secondary winding 24 between taps 44 and 46 is made equal to 2 to 1, which ratio is necessary to utilize power feedback circuits loaded by 20–40% more than the driver anode circuit admittance and to match certain yoke impedances or combined yoke and width control impedances to certain driver tube arrangements. The ratio between primary winding 26 and the portion of secondary winding 24 between the taps 44 and 45, is made equal to 3 to 1, which ratio is the proportion for most efficient matching of the standard 8 millihenry yoke impedance to conventional driver tubes.

In order to illustrate the flexibility of a universal transformer constructed in accordance with the principles of my invention, I have illustrated in Figs. 6, 7, and 8, several circuit arrangements to which the universal transformer may be readily adapted. In Fig. 6 there is shown the schematic diagram of the universal sweep and high voltage transformer and a typical circuit associated therewith. The terminal connections associated with the various coils described in connection with Figs. 1–4 are given similar reference numerals in Fig. 6. Referring now to Fig. 6, a horizontal sweep driver tube 65 is shown, the anode thereof being connected to the terminal 38, which is a junction of primary coil 26 and tertiary coil 28. The other end of primary 26 is connected through a capacitor 66 to ground and through an inductance 67 and a capacitor 68 to ground. The terminal 44, which is the finish of secondary winding 24, is connected to a unidirectional source of potential indicated by the battery 69. There is also connected across terminals 44, 45 of secondary winding 24, a scanning yoke inductance 70 which surrounds the neck of the cathode ray picture tube. A width control inductance 71, which may be adjustable by means of a slidable core of ferrite magnetic material or the like, is connected between the taps 45, 46 on secondary winding 44. The variable inductance 71 may be utilized to vary the energy delivered to the yoke 70 and thereby to vary the width of the picture produced.

Anode voltage for driver 65 is obtained through a power feedback circuit which is shown as comprising a diode damping tube 72, the anode of which is connected to tap 46 on the transformer, and the cathode of which is connected to the junction point of inductance 67 and capacitor 68. The power feedback circuit may also be used to provide increased anode voltage for the vertical sweep driver tube indicated in block diagram form at 73, and the horizontal sawtooth voltage generator indicated in block diagram at 74. It will be understood that increased anode voltage for other portions of the receiver may be taken from the power feedback circuit in a manner similar to that illustrated for the load 73, 74. The screen electrode 75 of driver tube 65 is also connected through a resistor 76 to the increased supply potential provided by the power feedback circuit across capacitor 68. The cathode of driver tube 65 is connected to ground and the control electrode thereof is supplied with a suitable scanning wave form 77 through a coupling network comprising a capacitor 78 and resistor 79.

The high voltage terminal 33 of tertiary winding 28 is connected to the anode of the high voltage rectifier 6, the cathode of rectifier 6 being connected to the single turn loop 30, which surrounds one leg of the transformer core as has been described more fully heretofore. The cathode of rectifier 6 is connected through a high voltage filter capacitor 80 to ground and a series protective resistor 81 is used to connect the high voltage produced across capacitor 80 to the accelerating anode of the cathode ray tube of the television receiver.

Briefly, describing the operation of the system illustrated in Fig. 6, the scanning wave form 77 supplied to the control electrode of driver tube 65, operates to produce a scanning wave of the appropriate wave form in the anode circuit of driver tube 65, this scanning wave being coupled to the scanning yoke 70 by transformer action between the primary 26 and secondary 24. The transformation ratio between the primary winding 26 and the portion of secondary winding 24 between the taps 44 and 45 should be chosen so as to provide optimum transfer of the energy provided by the driver tube 65 to the scanning inductance 70. With conventional driver tubes this ratio should be about 3 to 1, so as to provide the optimum amount of energy in a standard 8 millihenry scanning inductance 70. The width control inductance 71, which is coupled across taps 45, 46, operates to vary the loading of the secondary winding and thereby to vary the amount of energy supplied to scanning inductance 70.

The power feedback circuit comprising diode 72 and the filter network 66, 67 and 68, operates to increase the power supply voltage available for the anode and screen of the driver tube and also provides additional voltage for other portions of the receiver. It will be apparent that the damping diode 72 may be connected to any one of the taps 45, 46 or 48 varying levels of rectified voltage, at inversely related levels of current, for a constant product of power feedback will be obtained. Such a power feedback circuit is illustrated in my U. S. Patent No. 2,451,641, granted October 19, 1948.

The inductance 67 may be varied by a core of ferrite magnetic material or the like, and the network comprising inductance 67 and capacitor 66, operates to shift the phase of the ripple voltage appearing across capacitor 68 so as to obtain a linear cathode ray beam trace rate.

In the circuit arrangement illustrated in Fig. 6, a 260 volt unidirectional supply potential 69 has been found satisfactory to provide a high voltage of 11,000 volts and appropriate sweep for cathode ray tubes having a sweep angle of 52°, such as, for example, the type 12KP4 cathode ray tube with proper matching of the 8 millihenry scanning yoke 70 to the driver tube, which may be of the type 19BG6-G. The power feedback circuit provides a supply potential of 375 volts for the anode and screen of the driver tube 65, and also supplies adequate current for the vertical driver tube and horizontal scanning generator 73, 74. It may be noted that the damping tube 72 of the power feedback circuit may be connected to the tap 45 with resultant loss in recovered voltage in the event that an extremely large current load is to be energized thereby, such as, for example, the focus coil or audio output tube of the receiver.

In the circuit illustrated in Fig. 7, elements which are identical with the circuit of Fig. 6 have been indicated by the same reference numerals and a detailed description thereof is considered unnecessary herein. In Fig. 7, the damping tube 72 is connected to the uppermost tap 48 on secondary winding 24, so as to provide the optimum power feedback for driver tube 65. With a unidirectional supply potential of 350 volts and the optimum power feedback ratio, appropriate sweep and an accelerating voltage of 13,000 volts for 52° cathode ray tubes such as the 16AP4, is obtained. The increased high voltage is obtained while maintaining matching between the scanning yoke 70 and the driver tube 65, by recirculating all feedback power through the driver tube anode circuit.

In Fig. 8, there is illustrated an alternative circuit arrangement, elements which are identical with the circuit of Fig. 6 being indicated by the same reference numerals. In the circuit of Fig. 8 the power feedback circuit is connected to the uppermost tap 48 of secondary 24 as in Fig. 7. However, the scanning inductance is connected across the taps 44, 46 so as to provide proper matching between the driver tube 65 and the scanning yoke 70. This is necessary as a relatively low unidirectional supply 135 volts is utilized, this supply giving an accelerating voltage of 6000 volts, and appropriate scanning of 54° cathode ray tubes, such as the type 8AP4.

It is an important feature of my invention that the taps on secondary winding 24 are spaced apart by relatively large increments of inductance, thus providing the above-mentioned desirable transformation ratios. The ratio between primary and secondary of 1½ to 1 is desirable for optimum power feedback circuits. On the other hand, the ratio between primary and secondary of 3 to 1 is necessary to match conventional scanning yokes with conventional driver tubes and to supply voltages in excess of 260 v. for 11 kv. sweep as in Fig. 6, so as to provide an efficient transfer of energy therebetween. In arrangements heretofore proposed, it has not been possible to utilize the optimum ratio for power feedback circuits and at the same time utilize the optimum ratio for yoke impedance matching. This is because leakage reactance between the portions of the secondary windings prevents the power feedback diode, which also must act as a damping diode across the yoke impedance, from damping effectively transients which may occur at the termination of the retrace interval. However, in my improved transformer construction wherein solenoidal-type primary and secondary windings of substantial length are wound one on top of the other so as to provide extremely close coupling therebetween leakage reactance is minmized and it is possible to use one ratio for power feedback and a different ratio for yoke impedance matching without the introduction of objectionable transients into the scanning wave form, and without substantially reducing the efficiency of the transformer. Also, by providing taps on secondary winding 24 which are spaced apart by relatively large increments of inductance, the transformer will operate efficiently with double or quadruple the standard scanning yoke impedance, in the event that higher impedance scanning yokes are made available in the future. Thus, with my improved transformer construction, a truly universal type sweep and high voltage transformer is obtained.

My improved transformer construction also has the advantage of reducing transients which are produced at the anode of the driver tube due to yoke current switching. Due to the increased capacity between primary and secondary windings of the transformer the distributed capacity operates to damp out the anode transients so that a less expensive driver tube with considerably lower peak anode voltage rating may be utilized. It should be pointed out that whereas the capacity between primary and secondary has been increased to provide the above-mentioned advantage, the distributed capacity across the tertiary winding has been maintained at a minimum so that optimum high voltage may be obtained from the series combination of primary and tertiary windings.

From the foregoing, it is seen that the invention makes it possible to produce increased electromagnetic deflection of and high voltage for an improved type cathode ray tube picture reproduction, without increasing the power consumption of the television receiver. With this construction, it is entirely feasible to manufacture a standard sweep and high voltage transformer which has universal application in present day sweep and high voltage circuits. This is so despite the fact that various television receivers may have different operating potentials and different driver and damper tube arrangements, as the relatively large incremental changes in inductance provided by the taps on the secondary winding of the transformer allow a large range of selection of efficient operating conditions. The particular construction disclosed provides an extremely compact transformer of high efficiency in which the combination of a core of ferrite magnetic material and extremely close coupled primary and secondary windings allows flexibility by circuit operation.

While the present invention has been described by reference to a particular embodiment thereof, it will be understood that numerous modifications may be made by those skilled in the art without actually departing from the invention. I, therefore, aim in the appended claims to cover all such equivalent variations as come within the true spirit and scope of the foregoing disclosure.

What I claim as new and desire to secure by Letters Patent of the United States is:

1. A universal sweep and high voltage transformer comprising a base member, a pair of spaced insulating side panels supported on said base member and extending upwardly therefrom, said side panels having vertically extending aligned apertures therethrough, a core assembly comprising a pair of U-shaped core members of ferrite magnetic material positioned in opposed relation so as to define a rectangular window therebetween and having projections thereon extending through said aligned apertures, means for clamping said core members in abutting relation between said side panels whereby said core members are suspended therebetween, a cylindrical coil form surrounding an upper leg of said core assembly, a first coil surrounding said coil form and supported thereby, a second coil concentric with said first coil and supported thereby, said first and second coils being of substantially equal winding traverse and extending substantially the full width of said window opening, and a third disc-shaped coil concentric with said second coil and supported thereby, said third coil being positioned centrally of said window opening.

2. A universal sweep and high voltage transformer comprising a base member, a pair of spaced insulating side panels supported on said base member and extending upwardly therefrom, said side panels having vertically extending aligned apertures therethrough, a core assembly comprising a pair of U-shaped core members of ferrite magnetic material positioned in opposed relation so as to define a rectangular window therebetween and having projections thereon extending through said aligned apertures, means for clamping said core members in abutting relation between said side panels whereby said core members are suspended therebetween, a cylindrical coil form surrounding an upper leg of said core assembly, said coil form having a key way in one end thereof so as to prevent rotation about said leg, a first coil surrounding said coil form and supported thereby, a second coil concentric with said first coil and supported thereby, said first and second coils extending substantially the full width of said window opening, and a third disc-shaped coil concentric with said second coil and supported thereby, said third coil being positioned centrally of said window opening.

3. A universal sweep and high voltage transformer comprising a base member, a pair of spaced insulating side panels supported on said base member and extending upwardly therefrom, said side panels having vertically extending aligned apertures therethrough, a core assembly comprising a pair of U-shaped core members of ferrite magnetic material positioned in opposed relation so as to define a rectangular window therebetween and having projections thereon extending through said aligned apertures, means for clamping said core members in abutting relation between said side panels whereby said core members are suspended therebetween, a cylindrical coil form surrounding an upper leg of said core assembly, said coil form having a key way in one end thereof so as to prevent rotation about said leg, a first coil surrounding said coil form and supported thereby, a second coil concentric with said first coil and supported thereby, said first and second coils extending substantially the full width of said window opening, a third disc-shaped coil concentric with said second coil and supported thereby, said third coil being positioned centrally of said window opening, a plurality of terminals positioned on one of said side panels, connections between said first and said second coils and said terminals, a high voltage terminal positioned on the other of said side panels, and means for connecting said third coil to said high voltage terminal.

4. A universal sweep and high voltage transformer comprising a base member, a pair of spaced insulating side panels supported on said base member and extending upwardly therefrom, said side panels having vertically extending aligned apertures therethrough, a core assembly comprising a pair of U-shaped core members of ferrite magnetic material positioned in opposed relation so as to define a rectangular window therebetween and having projections thereon extending through said aligned apertures, means for clamping said core members in abutting relation between said side panels whereby said core members are suspended therebetween, a cylindrical coil form surrounding an upper leg of said core assembly, said coil form having a key way in one end thereof so as to prevent rotation about said leg, a first coil surrounding said coil form and supported thereby, a second coil concentric with said first coil and supported thereby, said first and second coils extending substantially the full width of said window opening, the high potential end of said second winding emerging therefrom at a point other than the edge thereof, a third disc-shaped coil concentric with said second coil and supported thereby, said third coil being positioned centrally of said window opening, a plurality of terminals positioned on one of said side panels, connections between said first and second coils and said terminals, a high voltage terminal positioned on the other of said side panels and means for connecting said third coil to said high voltage terminal.

5. A transformer comprising a base member, a pair of insulating side panels supported on said base member and extending upwardly therefrom, said side panels having aligned apertures therethrough, a core assembly comprising a pair of U-shaped core members of magnetic material positioned in opposed relation so as to define a rectangular window therebetween and having portions thereof extending through said aligned apertures, means for clamping said core members in abutting relation between said side panels whereby said core members are suspended therebetween, a coil form surrounding a leg of said core assembly extending between said panels, and a coil winding surrounding said coil form and supported thereby.

6. A transformer comprising a base member, a pair of insulating side panels supported on said base member and extending upwardly therefrom, said side panels having vertically extending aligned apertures therethrough, a core assembly comprising a pair of U-shaped core members of magnetic material positioned in opposed relation so as to define a rectangular window therebetween and having portions thereof extending through said aligned apertures, means for clamping said core members in abutting relation between said side panels whereby said core members are suspended therebetween, a coil form surrounding an upper leg of said core assembly, and a coil winding surrounding said coil form and supported thereby.

7. A high voltage sweep transformer for a cathode ray deflection system comprising a base member, a pair of insulating side panels supported on said base member and extending upwardly therefrom, said side panels having vertically extending aligned apertures therethrough, a core assembly comprising a pair of U-shaped core members of magnetic material having a high specific resistivity positioned in opposed relation so as to define a rectangular window therebetween and having portions thereof extending through said aligned apertures, means for clamping said core members in abutting relation between said side panels whereby said core members are suspended therebetween, a coil form surrounding an upper leg of said core assembly, and a multi-layer coil winding surrounding said coil form and supported thereby, the layers of said coil winding being of substantially equal winding traverse and extending substantially the full width of said window opening.

8. A high voltage sweep transformer for a cathode ray deflection system comprising a base member, a pair of insulating side panels supported on said base member and extending upwardly therefrom, said side panels having vertically extending aligned apertures therethrough, a core assembly comprising a pair of U-shaped core members of magnetic material having a high specific resistivity positioned in opposed relation so as to define a rectangular window therebetween and having portions thereof extending through said aligned apertures, means for clamping said core members in abutting relation between said side panels whereby said core members are suspended therebetween, a coil form surrounding an upper leg of said core assembly, a multi-layer coil winding having primary and secondary connections surrounding said coil form and supported thereby, the layers of said coil winding being of substantially equal winding traverse and extending substantially the full width of said window opening, and a relatively narrow disc-shaped coil concentric with said first coil winding and supported thereby, said disc-shaped coil being positioned centrally of said window opening.

CHARLES E. TORSCH.

References Cited in the file of this patent

UNITED STATES PATENTS

| Number | Name | Date |
|---|---|---|
| 1,628,398 | Casper et al. | May 10, 1927 |
| 1,669,929 | Currier | May 15, 1928 |
| 2,221,983 | Mayer | Nov. 19, 1940 |
| 2,374,579 | Garin | Apr. 24, 1945 |
| 2,428,948 | Torsch et al. | Oct. 14, 1947 |
| 2,431,867 | Galla | Dec. 2, 1947 |
| 2,441,213 | Sutter | May 11, 1948 |
| 2,452,529 | Snoek | Oct. 26, 1948 |
| 2,473,034 | Shaheen | June 14, 1949 |
| 2,482,489 | Kaiser | Sept. 20, 1949 |
| 2,485,599 | Halvorsen | Oct. 25, 1949 |
| 2,500,766 | Obert et al. | Mar. 14, 1950 |
| 2,513,161 | Friend | June 27, 1950 |